US008797913B2

(12) United States Patent
Nandagopal et al.

(10) Patent No.: US 8,797,913 B2
(45) Date of Patent: Aug. 5, 2014

(54) REDUCTION OF MESSAGE AND COMPUTATIONAL OVERHEAD IN NETWORKS

(75) Inventors: Thyaga Nandagopal, Edison, NJ (US); Kiran M. Rege, Marlboro, NJ (US); Krishan Sabnani, Westfield, NJ (US); Wim Henderickx, Westerlo (BE)

(73) Assignee: Alcatel Lucent, Boulogne-Billancourt (FR)

( * ) Notice: Subject to any disclaimer, the term of this patent is extended or adjusted under 35 U.S.C. 154(b) by 686 days.

(21) Appl. No.: 12/945,318

(22) Filed: Nov. 12, 2010

(65) Prior Publication Data
US 2012/0120808 A1 May 17, 2012

(51) Int. Cl.
*H04L 12/28* (2006.01)

(52) U.S. Cl.
USPC .......................................... 370/254; 370/238

(58) Field of Classification Search
None
See application file for complete search history.

(56) References Cited

U.S. PATENT DOCUMENTS

| 6,098,078 A * | 8/2000 | Gehani et al. ................ 707/610 |
| 2002/0184388 A1* | 12/2002 | Yaseen et al. ................ 709/242 |
| 2005/0078610 A1* | 4/2005 | Previdi et al. ................ 370/254 |
| 2009/0172190 A1* | 7/2009 | Yadav et al. ................ 709/241 |

OTHER PUBLICATIONS

J. Moy, OSPF Version 2, Ascend Communications, Inc., Apr. 1998, The Internet Society (1998). RFC 2328. pp. 1-245.
R. Coltun et al., OSPF for IPv6, Jul. 2008, RFC 5340 pp. 1-95.
Behrens J et al. "Distributed, Scalable Routing Based on Link-State Vectors", Computer Communication Review, ACM, New York, NY, US vol. 24, No. 4, Oct. 1, 1994, pp. 136-147.
International Search Report for PCT/US2011/056138 dated Apr. 27, 2012.
Behrens J et al. "Distributed, Scalable Routing Based on Link-State Vectors", Computer Communication Review, ACM, New York, US, vol. 24. No. 4, Oct. 1, 1994, pp. 136-174.
Partial International Search for PCT/US2011/056138 dated Feb. 21, 2012.
J.J. Garcia-Luna-Aceves and J. Behrens, "Distributed, Scalable Routing Based on Vectors of Link States", in IEEE Journal on Selected areas in Communications, vol. 13, No. 8, Oct. 1995.
Korean Office Action Mar. 27, 2014; Korean Application No. 2013-7012156.

* cited by examiner

*Primary Examiner* — Kevin C Harper
*Assistant Examiner* — Samina Choudhry
(74) *Attorney, Agent, or Firm* — Kramer Amado P.C.

(57) ABSTRACT

Various exemplary embodiments relate to a method and related network node including one or more of the following: receiving, at the node, a network update message; determining whether the network update message should be propagated to other nodes; if the network update message should be propagated to other nodes, forwarding the network update message to at least one other node; and if the network update message should not be propagated to other nodes, refraining from forwarding the network update message to any other node. Various further embodiments relate to a method and related network node including one or more of the following: determining a first time period for the network update message; setting the first time period as a delay time; waiting for the delay time; and after the delay time has elapsed, computing new routing information based on the network update message.

24 Claims, 6 Drawing Sheets

| | Destination | Next Hop |
|---|---|---|
| 310 | A | B |
| 320 | B | B |
| 340 | D | D |
| 350 | E | D |
| 360 | F | D |
| 370 | G | D |

REDUCTION OF MESSAGE AND COMPUTATIONAL OVERHEAD IN NETWORKS

TECHNICAL FIELD

Various exemplary embodiments disclosed herein relate generally to network traffic routing.

BACKGROUND

Packet-switched networks are used to provide an ever-increasing amount of today's varied forms of communication. In addition to computer-to-computer communication via networks such as the Internet, packet-switched networks enable the communication of information associated with other applications such as television, telephone, and radio. Through these and other applications, end users may transmit and receive a multitude of information types over great distances.

In order to move such information from its source to its destination, packet-switched networks employ a number of interconnected routing devices. When one router receives a packet of data, the router will determine where the packet's destination is located and forward the packet to the next closest router. This next router will follow a similar procedure and, in this manner, the packet will eventually be delivered to its destination, much like a "bucket brigade."

One significant problem in packet switched networks is providing each network with the information necessary to make the determination of which "next hop" router to which each packet should be transmitted. While, in theory, this information could be manually programmed into the router, the size and dynamic nature of network topologies usually render this method impracticable. Instead, various protocols have been developed for automatically determining the best path to each destination for each router. For example, the Open Shortest Path First standard provides for routers within an autonomous system to share information regarding the state of links within the system. Using this information, each router can independently develop a forwarding table for use in determining where each received packet should be sent. When the network state changes, each router updates its forwarding table to ensure that each destination remains reachable and that each path chosen is optimal.

SUMMARY

While standards such as Open Shortest Path First (OSPF) provide a working solution to the problem of generating routing information, these standards often take a "brute force" approach. For example, in OSPF implementations, a link state advertisement (LSA) must be propagated throughout an entire "area" of the autonomous system whenever a change occurs in the network. These LSAs are then used by each node to update local forwarding tables to cope with the network change. With the potential frequency of nodes being added to the network, nodes being removed from the network, nodes entering a faulty state, nodes recovering from a faulty state, and other network changing events, a considerable amount of bandwidth may be devoted to propagating LSAs while a similarly large number of time may be used by each node to process the LSAs.

Accordingly, there is a need for a method of reducing the overhead associated with propagating and processing network update messages. In particular, it would be desirable to provide a method and network node that reduces the number of network update messages transmitted and processed.

In light of the present need for a method of reducing the overhead associated with propagating and processing LSAs or other network update messages, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various exemplary embodiments provide a network router that identifies irrelevant LSAs and refrains from propagating such packets. For example, such a router may use various methods to determine whether a particular received LSA will result in a change to local forwarding information. If the LSA will lead to updated routing information (e.g., changes in the router's forwarding table), the LSA may be forwarded to other nodes. If the LSA has no bearing on the routing information, however, the network node may refrain from propagating the LSA further within the network.

Various exemplary embodiments further provide a network router that reduces the amount of time spent re-computing routing information based on received LSAs. Such a router may delay the processing of LSAs to allow for the arrival and batch processing of additional LSAs. Various embodiments calculate a delay time for each LSA based on the potential relevance of the network changes described therein. For example, an LSA describing a change that is only one hop away may be delayed for less time, if any, than an LSA describing a change occurring 10 hops away.

Various exemplary embodiments relate to a method and related network node including one or more of the following: receiving, at the node, a network update message; determining whether the network update message should be propagated to other nodes; if the network update message should be propagated to other nodes, forwarding the network update message to at least one other node; and if the network update message should not be propagated to other nodes, refraining from forwarding the network update message to any other node. Various further embodiments relate to a method and related network node including one or more of the following: determining a first time period for the network update message; setting the first time period as a delay time; waiting for the delay time; and after the delay time has elapsed, computing new routing information based on the network update message.

Various exemplary embodiments relate to a network node including one or more of the following: a first interface that receives a packet from another node within the network; a second interface that transmits packets to other nodes; a network update message identifier that determines that the packet is an network update message; an network update message relay module that: determines whether the network update message should be forwarded to other nodes, if the network update message should be forwarded to other nodes, forwards the network update message to at least one other node via the second interface, and if the network update message should not be forwarded to other nodes, refrains from forwarding the network update message to any other nodes. Various further embodiments relate to a network node including one or more of the following: a first interface that receives a packet from another node within the network; a network update message identifier that determines that the packet is an network update message; a routing information delay module that: determines a first time period for the network update message, sets the first time period as a delay time, and waits for the delay time; and a routing information generator that, after the delay time has elapsed, computes new routing information based on the network update message.

It should be apparent that, in this manner, various exemplary embodiments enable reduction of overhead associated with changes in network state. In particular, by avoiding propagation of update messages that have no bearing on routing information, bandwidth overhead may be reduced. Further, by delaying the processing of received network updates, multiple network updates may be processed at a single time and processing overhead may be reduced.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
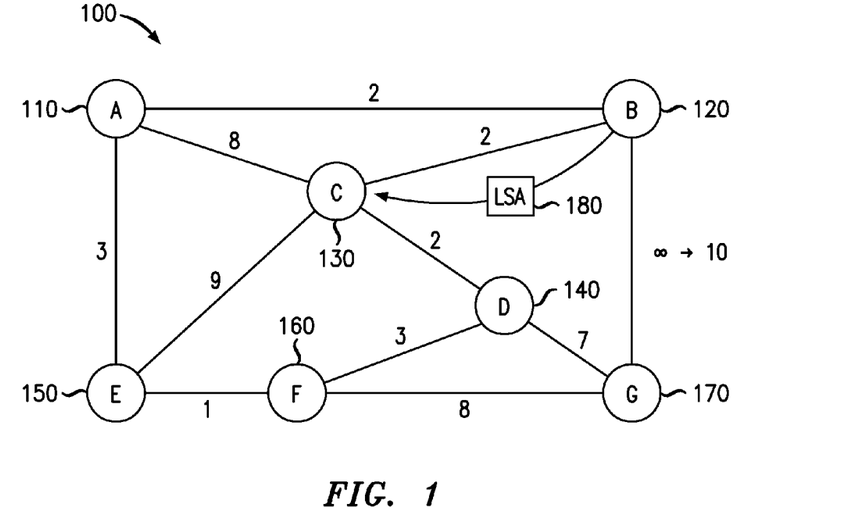
FIG. 1 illustrates an exemplary network for routing data packets.

FIG. 1 illustrates an exemplary network 100 for routing data packets. Exemplary network 100 may be a packet-switched communications network for providing data transfer for various applications. Exemplary network 100 may further implement a standard for automatic updating of routing information in response to changes within the network. For example, network 100 may constitute an autonomous system implementing the Open Shortest Path First (OSPF) standard.

Exemplary network may include a number of nodes A-G 110-170. Each node A-G 110-170 may be a router, switch, or other network equipment adapted to receive and forward data packets toward the packets' respective destinations. Each node may also be connected to a number of additional devices (not shown) such as additional network devices and end user equipment.

Nodes A-G 110-170 may each be connected to one or more other nodes A-G 110-170 via one or more links. Each link may be associated with a link cost. For example, node C 130 may be connected to node D 140 via a link having cost 2. This link cost may be assigned based on various factors such as, for example, the geographic distance between the nodes, the number of intermediate devices between the nodes, the bit-rate associated with the link, and/or the current load on the link. Some links may be faulty and thus undesirable for forwarding packets. Such links may accordingly be assigned a very high or infinite link cost to discourage use.

During operation, the characteristics of network 100 may change. For example, a previously faulty link may be restored, as in the case of the link between node B 120 and node G 170. Other network changes may include, for example, a link cost changing, a node or link entering a faulty state, a node or link recovering from a faulty state, a node or link being added, and/or a node or link being removed.

After such a network change, an update message may be transmitted to other nodes. For example, in the OSPF implementation of exemplary network 100, node B 120 may transmit a link state advertisement (LSA) 180 to node C 130 to indicate that the link between node B 120 and node G 170 has recovered from a faulty state and now has a link cost of 10. Node B 120 and Node G 170 may further transmit similar or identical LSAs (not shown) to all other nodes to which they are connected. According to the OSPF standard, the LSAs will then be passed by this group of receiving nodes to all of their neighbors. In this manner, each node will receive an LSA indicating the new status of the link.

Not all LSAs may be relevant to all nodes A-G 110-170. For example, while the restored link may be the best path for traffic directly between node B 120 and node G 170, node C 130 may continue to use its pre-established paths to both of these nodes.

Each node A-G 110-170 may store a local representation of exemplary network 100. Such a local representation may be constructed locally from information conveyed in the LSA messages transmitted by other nodes A-G 110-170 according to OSPF. For example, each node may store an indication of all nodes and edges in a Link State Database (LSDB). Such a representation may be used by each node A-G 110-170 to construct a shortest path tree and, ultimately, a forwarding table for use in forwarding packets to their destination.

Figure 2:
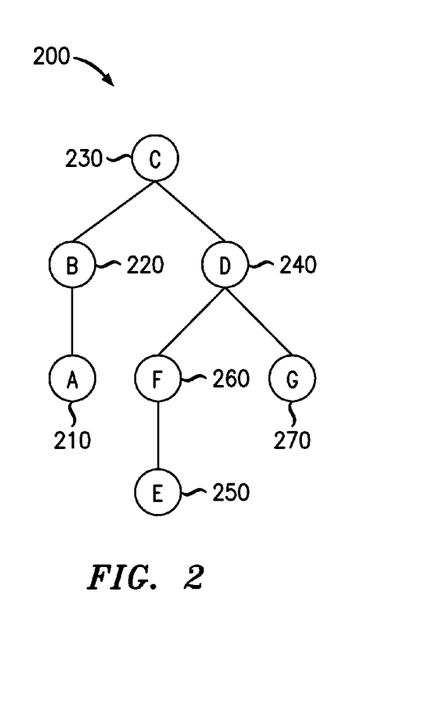
FIG. 2 illustrates an exemplary shortest path tree for determining the optimal path from one node to a number of other possible nodes.

FIG. 2 illustrates an exemplary shortest path tree (SPT) 200 for determining the optimal path from one node to a number of other possible nodes. SPT 200 may be constructed from a representation of the current state of the network, such as exemplary network 100, using any method known to those of skill in the art. For example, a node may use Djikstra's Shortest Path Tree algorithm to construct an SPT.

SPT 200 may be an SPT constructed by node C 130 in view of exemplary network 100. SPT 200 may include a number of node representations A-G 210-270 corresponding to nodes A-G 110-170. SPT 200 may indicate the optimal path to each node within the network from node C 130. For example, SPT 200 indicates that the shortest path from node C 130 to node G 170 is through node D 140, rather than through node B 120 or some other path. Accordingly, packets received by node C 130 destined for node G 170 should be forwarded to node D 140, according to SPT 200. Node D 140, in turn, may include its own routing information enabling it to forward the packet to node G 170.

After computing SPT 200, node C 130 may update its forwarding table to reflect the state of exemplary network 100. In particular, node C 130 may analyze SPT 200 to determine the next hop node that should be used for each potential destination node. This information may then be stored in a forwarding table for quick access when forwarding packets.

Figure 3:
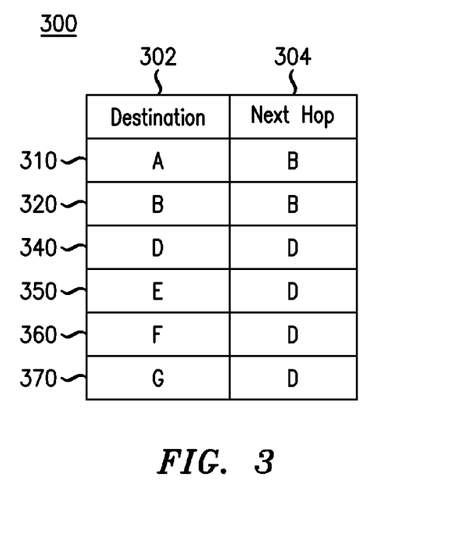
FIG. 3 illustrates an exemplary forwarding table for determining a next hop to which a packet should be transmitted based on the packet destination.

FIG. 3 illustrates an exemplary forwarding table 300 for determining a next hop to which a packet should be transmitted based on the packet destination. Forwarding table 300 may be, for example, a table in a database stored at node C 130. Alternatively, forwarding table 300 could be a series of linked lists, an array, or a similar data structure. Thus, it should be apparent that forwarding table 300 is an abstraction of the underlying data; any data structure suitable for storage of the underlying data may be used.

Forwarding table 300 may include a destination field 302 and a next hop field 304. Destination field 302 may indicate a destination device with which the corresponding entry is associated while next hop field 304 may indicate which next hop device is appropriate for the associated destination device. It should be apparent that forwarding table 300 is, in some respects, a simplification. For example, forwarding table may contain additional fields such as an outgoing port number, a destination MAC address, and/or an alternate next hop. Various modifications will be apparent to those of skill in the art. It should be apparent that the data shown in exemplary table 300 is in some respects an abstraction and/or simplification; for example, destination field 302 may store an address of one or more destination nodes.

Forwarding table may include a number of entries 310-370. Entry 310 may indicate that packets destined for node A 110 should be forwarded to node B 120. Likewise, entry 320 may indicates that packets destined for node B 120 should be forwarded directly to that node. Entries 340-370 may indicate that packets destined for nodes D-G 140-170, respectively, should be forwarded to node D 140.

Having described the components of exemplary network 100, a brief summary of the operation of exemplary network 100 will be provided. It should be apparent that the following description is intended to provide an overview of the operation of exemplary network 100 and is therefore a simplification in some respects. The detailed operation of exemplary network 100 will be described in further detail below in connection with FIGS. 4-10.

After node C 130 has received LSA 180, node C 130 may determine whether the LSA should be propagated to other nodes such as node A 110, node D 140, and/or node E 150. Node C 130 may consult SPT 200 and determine that it is not currently using the link between node B 120 and node G 170. Next, node C 130 may compute a new SPT based on the LSA 180 and determine that the new SPT is identical to the current SPT and, accordingly, refrain from propagating LSA 180 to any other nodes.

Node C 130 may also determine that local processing of LSA 180 should be delayed for some time period such as, for example, 100 ms. Once this 100 ms has elapsed, Node C 130 may proceed to update its routing information in view of LSA 180 and any other LSAs (not shown) that may have arrived during the delay.

Figure 4:
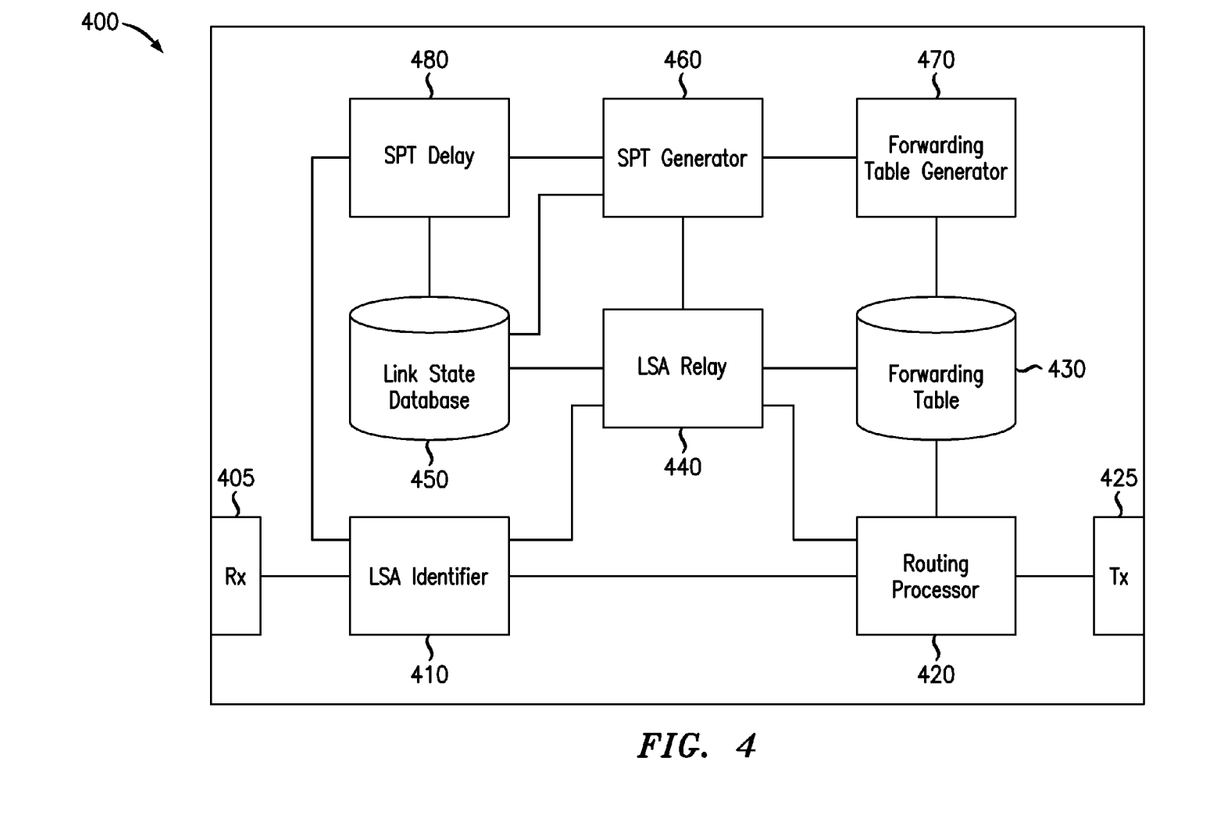
FIG. 4 illustrates an exemplary network node for routing packets and reducing network overhead associated with link state advertisements (LSAs)

FIG. 4 illustrates an exemplary network node 400 for routing packets and reducing network overhead associated with link state advertisements (LSAs). Network node 400 may correspond to one or more nodes A-G 110-170 in exemplary network 100. Network node 400 may include a packet receiver 405, a link state advertisement identifier 410, a routing processor 420, a packet transmitter 425, a forwarding table storage 430, a link state advertisement relay module 440, a link state database 450, a shortest path tree generator 460, a forwarding table generator 470, and/or a shortest path tree delay module 480.

Packet receiver 405 may be an interface comprising hardware and/or executable instructions encoded on a machine-readable storage medium configured to receive packets from other network devices. Packet receiver 405 may include multiple ports and may receive packets from multiple network devices. For example, packet receiver 405 may receive link state advertisement packets and packets associated with regular network traffic.

Link state advertisement (LSA) identifier 410 may include hardware and/or executable instructions on a machine-readable storage medium configured to determine whether a received packet is an LSA that the node 400 should process. If the packet is an LSA, LSA identifier 410 may notify the LSA relay module 440 and/or SPT delay module 480 that a new LSA has arrived by, for example, passing the LSA to those components. Otherwise, LSA identifier may pass the packet to routing processor 420 for further routing.

It should be noted that, while various embodiments described herein relate to systems using link state advertisements constructed according to OSPF, various embodiments may work in conjunction with other standards using alternative network update messages. Accordingly, LSA identifier 410 may be viewed as a generic network update message identifier. Modifications useful for implementation in conjunction with such other standards will be apparent to those of skill in the art.

Routing processor 420 may include hardware and/or executable instructions on a machine-readable storage medium configured to route packets toward their destination. Routing processor 430 may extract a destination from each received packet and determine a next hop for that destination by using a forwarding table stored in forwarding table storage 430. Routing processor 420 may then forward the packet, via transmitter 425, to the appropriate next hop.

Packet transmitter 425 may be an interface comprising hardware and/or executable instructions encoded on a machine-readable storage medium configured to transmit packets to other network devices. Packet transmitter 425 may include multiple ports and may transmit packets to multiple network devices. For example, packet transmitter 425 may transmit link state advertisement packets and packets associated with regular network traffic.

Forwarding table storage 430 may be any machine-readable medium capable of storing a forwarding table. Accordingly, forwarding table storage 430 may include a machine-readable storage medium such as read-only memory (ROM), random-access memory (RAM), magnetic disk storage media, optical storage media, flash-memory devices, and/or similar storage media.

Link state advertisement (LSA) relay module 440 may include hardware and/or executable instructions on a machine-readable storage medium configured to determine whether each received LSA should be propagated to other nodes within the network. For example, in various embodiments, LSA relay module 440 may determine that only those LSAs likely to have an effect on local routing information should be propagated to other nodes. Various methods for making such a determination will be described in greater detail below with respect to FIGS. 5-7.

Alternative or additional criteria may be used for determining whether to forward a received LSA. For example, LSA relay module 440 may estimate whether an LSA will affect another node's routing information and subsequently forward LSAs to those nodes likely to be affected. As another example, LSA relay module 440 may attempt to group subsequent LSAs and refrain from propagating any LSAs tending to override other LSAs. Other methods for determining the relevance of an LSA to other nodes will be apparent to those of skill in the art.

According to various alternative embodiments, rather than refraining from LSA propagation when no routing information update was necessitated by an LSA, LSA relay module 440 may construct a marked LSA and subsequently forward the marked LSA. Such construction may include constructing an entirely new LSA or simply marking a bit or field in the received LSA to produce a marked LSA. For example, LSA relay module 440 may set a bit in the header of the LSA to indicate that the LSA did not lead to a change in routing information. LSA relay module 440 may then forward the LSA to at least one other node per OSPF. Such other nodes may then take the bit into account when determining whether and how to process the LSA. For example, a node receiving such a marked LSA may determine whether the sending node is on its current path to the link or node identified by the LSA. If so, the receiving node may ignore the LSA. Otherwise, the receiving node may process the LSA as normal.

According to additional alternative embodiments, LSA relay module 440 may delay an irrelevant LSA rather than refraining from propagating the message entirely. According to such embodiments, when an LSA is judged to have no bearing on a node's routing information, the LSA may be delayed for future transmission. For example, the LSA may be queued with other delayed packets. All messages in such a queue may be transmitted to other nodes after a periodic timer indicates that a predetermined time interval has passed. As another example, such an LSA may simply be queued and transmitted whenever another LSA is received and will be propagated. The two LSAs may then be transmitted together.

Link state database (LSDB) 450 may be any machine-readable medium capable of storing a representation of the current network state. LSDB 450 may, for example, store an indication of every node and link within an autonomous system. Accordingly, LSDB 450 may include a machine-readable storage medium such as read-only memory (ROM), random-access memory (RAM), magnetic disk storage media, optical storage media, flash-memory devices, and/or similar storage media. LSDB 450 may be an independent storage device within node 400 or may be the same as forwarding table storage 430.

Shortest path tree (SPT) generator 460 may include hardware and/or executable instructions on a machine-readable storage medium configured to generate a shortest path tree from a representation of a network. For example, SPT generator 460 may use Djikstra's algorithm or any other method known to those of skill in the art to generate a shortest path tree from data stored in LSDB 450. After generating an SPT, SPT generator 460 may transmit the SPT to forwarding table generator 470.

Forwarding table generator 470 may include hardware and/or executable instructions on a machine-readable storage medium configured to generate or update a forwarding table based on an SPT. For example, forwarding table generator 470 may determine whether any entries in forwarding table storage 430 should be added or modified based on the current SPT for the network node 400. Forwarding table generator 470 may then perform such updates by, for example, adding or removing entries or modifying the next hop of one or more entries.

It should be noted that, while node 400 is described as functioning according to various aspects of OSPF, the methods described herein may be applicable to other standards. Appropriate modifications for compliance with other standards will be apparent to those of skill in the art. Accordingly, SPT generator 460 and forwarding table generator 470 may be viewed, separately or together, as a generic "routing information generator."

Shortest path tree (SPT) delay module 480 may include hardware and/or executable instructions on a machine-readable storage medium configured to delay the processing of an incoming LSA. According to various embodiments, SPT delay module 480 may generate a delay time based on various criteria associated with the LSA, wait until the delay time has elapsed, and subsequently instruct SPT generator 460 to process the LSA. This process will be described in greater detail with respect to FIGS. 5 and 8. If, while waiting for the delay time to elapse, additional LSAs are received, SPT delay module 480 may update the delay time such that processing of the original LSA will occur either sooner or later than originally specified. At such time, SPT generator 460 may process only the first received LSA or, alternatively, all LSAs received during the delay.

Figure 5:
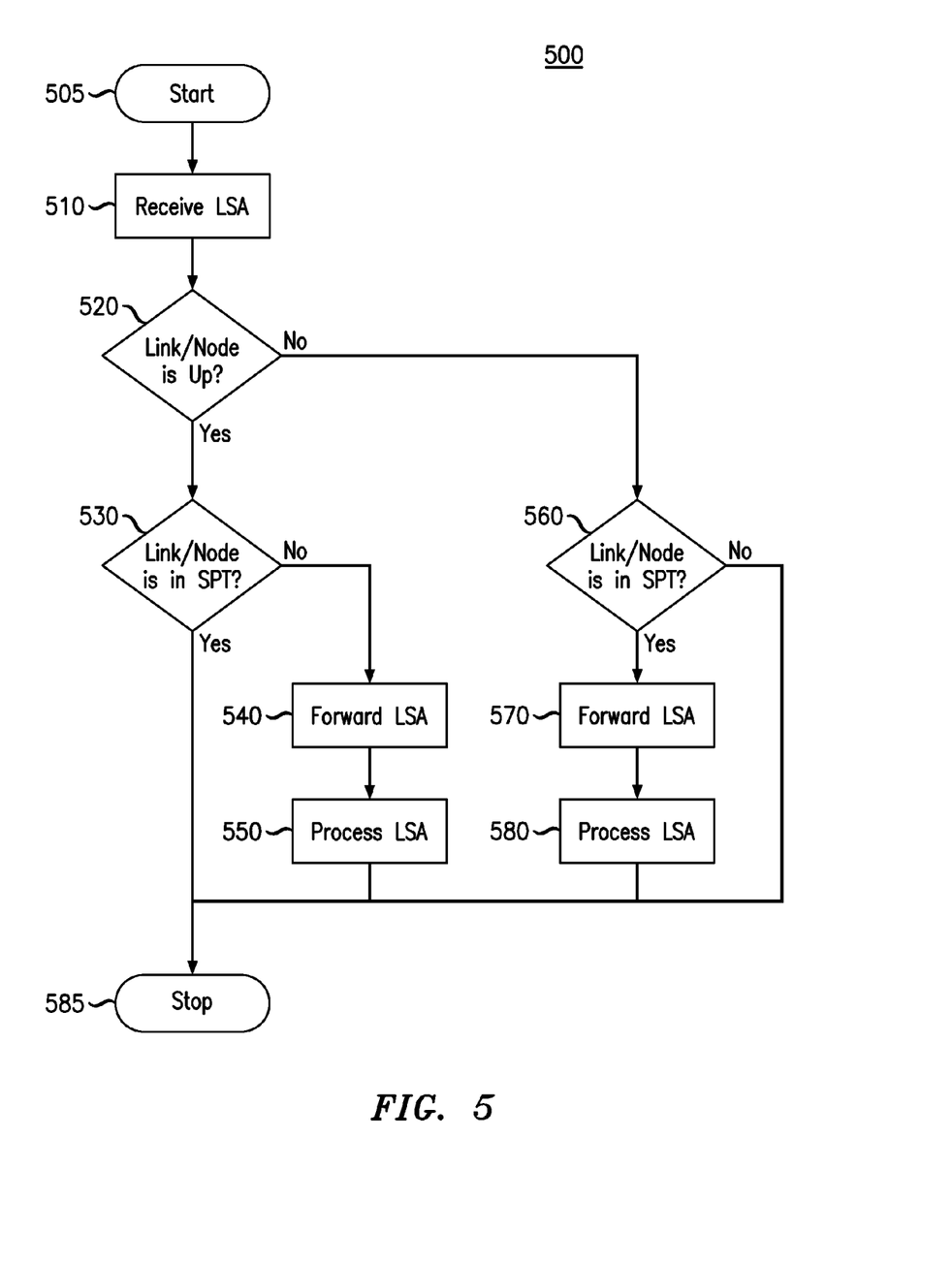
FIG. 5 illustrates an exemplary method for reducing overhead in a network associated with LSAs.

FIG. 5 illustrates an exemplary method 500 for reducing overhead in a network associated with LSAs. Method 500 may be performed by the various components of network node 400 such as, for example, LSA identifier 410, LSA relay module 440, SPT generator 460, forwarding table generator 470, and/or SPT delay module 480.

Method 500 may begin in step 505 and proceed to step 510 where node 400 may receive and identify an LSA. According to various alternative embodiments, the methods described herein may only be applied to a subset of received LSAs. For example, method 500 may apply only to LSAs of type 1, 2, or 8, as defined by the OSPF standard. According to such embodiments, if node 400 identifies an LSA of another type, the LSA may be processed according to alternative methods such as those defined by OSPF.

Method 500 may then proceed to step 520, where node 400 may determine whether the LSA indicates that a link or node is available for routing packets. If so, method 500 may proceed to step 530, where node 400 may analyze its local routing information. For example, node 400 may determine whether the current SPT includes the node or link in question. Various embodiments may alternatively or additionally check other routing information in step 530 for the presence of the node or link identified in the LSA. For example, node 400 may refer to the forwarding table. Accordingly, step 530 may generally check a relevant network path structure for presence of the node or link. If the link or node is already in the SPT or other routing information, the LSA is determined to be of little or no relevance. Accordingly, method 500 may proceed to end in step 585 without propagating the LSA.

If, on the other hand, the link or node is not found in the current SPT, method 500 may proceed to step 540. In step 540, node 400 may simply forward the LSA to other nodes without further processing. Alternatively, node 400 may perform additional estimations of LSA relevance before determining whether the LSA should be forwarded. Examples of such additional procedures will be described in further detail below with respect to FIGS. 6-7. Method 500 may then proceed to step 550 where node 400 may process the LSA to update the local forwarding table. This step may include delaying the processing for some time, as will be described in further detail with reference to FIG. 8, below. Method 500 may then proceed to end in step 585.

Returning to step 520, if it is determined that the LSA does not indicate that a node or link is now available, method 500 may proceed instead to step 560. For example, LSA may indicate that a node or link is now unavailable for packet routing. Step 560 may be similar to step 530 in that node 400 will determine whether the node or link in question is used by the SPT or other routing information. If the node or link in question is used by the SPT or other routing information, method 500 may proceed to step 570. Step 570 may be similar to step 540. Alternatively, step 570 may use different processing for determining whether the LSA should be forwarded.

Method 500 may then proceed to step 580, where the LSA may be processed locally, similar to step 550. Method 500 may then end in step 585.

If it is instead determined at step 560 that the node or link in question is not used by the SPT, method 585 may simply end in step 585, without forwarding the LSA to any other nodes. In various alternative embodiments, the local processing of LSAs may be wholly independent LSA propagation. Accordingly, steps similar to step 550 and/or step 580 may be performed regardless of the outcome of steps 520, 530, 560.

Figure 6:
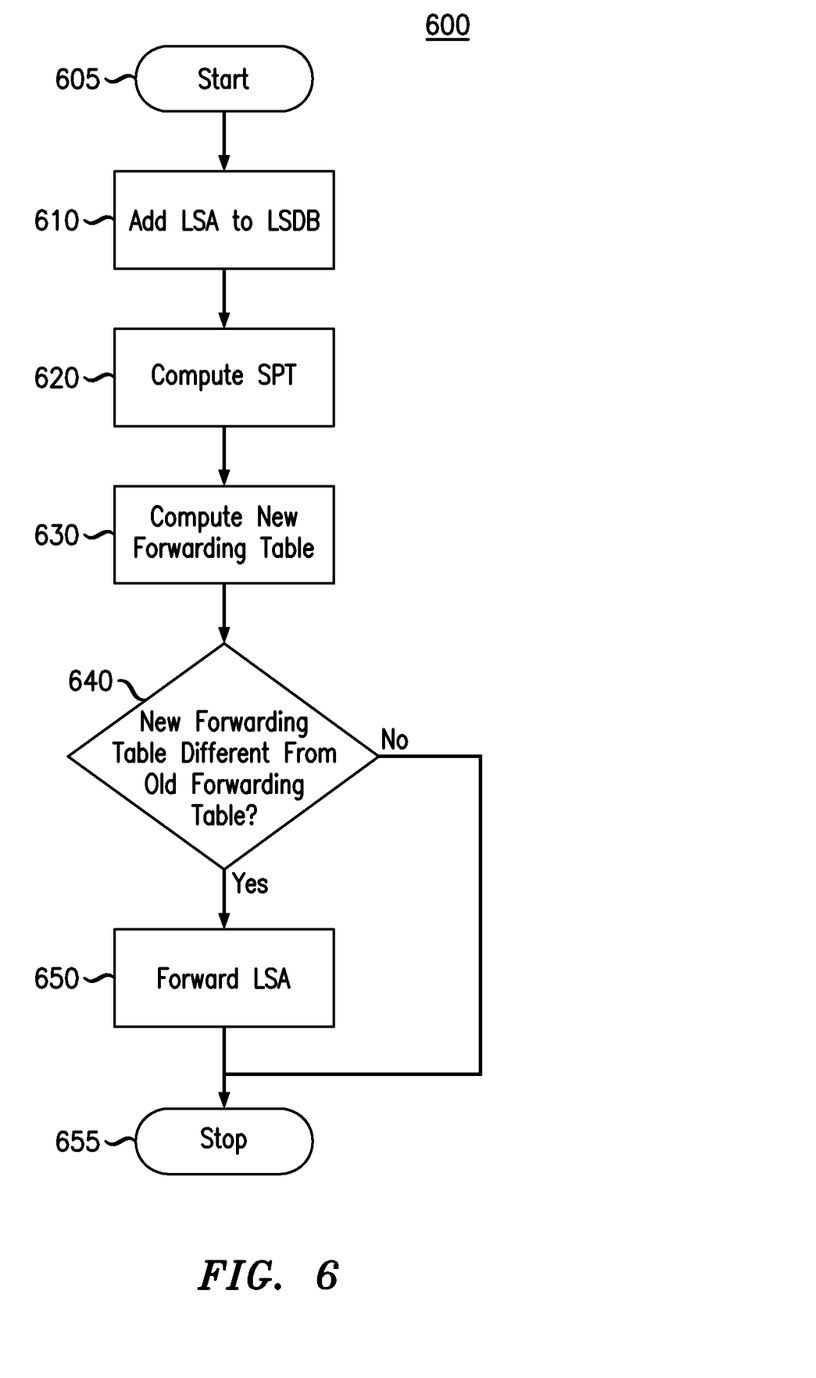
FIG. 6 illustrates an exemplary method for deciding whether to propagate an LSA.

FIG. 6 illustrates an exemplary method 600 for deciding whether to propagate an LSA. Method 600 may be performed by the various components of network node 400 such as, for example, LSA relay module 440, SPT generator 460, and/or forwarding table generator 470. Method 600 may correspond to step 540 and/or step 570 of method 500. In various alternative embodiments, method 600 may be implemented in place of at least some of steps 520-580 of method 500.

Method 600 may begin in step 605 and proceed to step 610 where node 400 may add the information carried by the previously received LSA to the link state database (LSDB) 450 or other storage. Then, in step 620, node 400 may compute a new SPT, taking into account the newly received information. Method 600 may then proceed to step 630, where node 400 may compute a new forwarding table or update the previous forwarding table, based on the new SPT.

In step 640, node 400 may determine whether the newly computed or updated forwarding table is different than the previous forwarding table. If the two tables are different, thereby signifying that the LSA includes relevant network state information, method 600 may proceed to step 650 where node 400 will forward the LSA to other nodes. If, however, the LSA did not lead to a change in the forwarding table, method 600 will proceed directly from step 640 to end in step 655.

Figure 7:
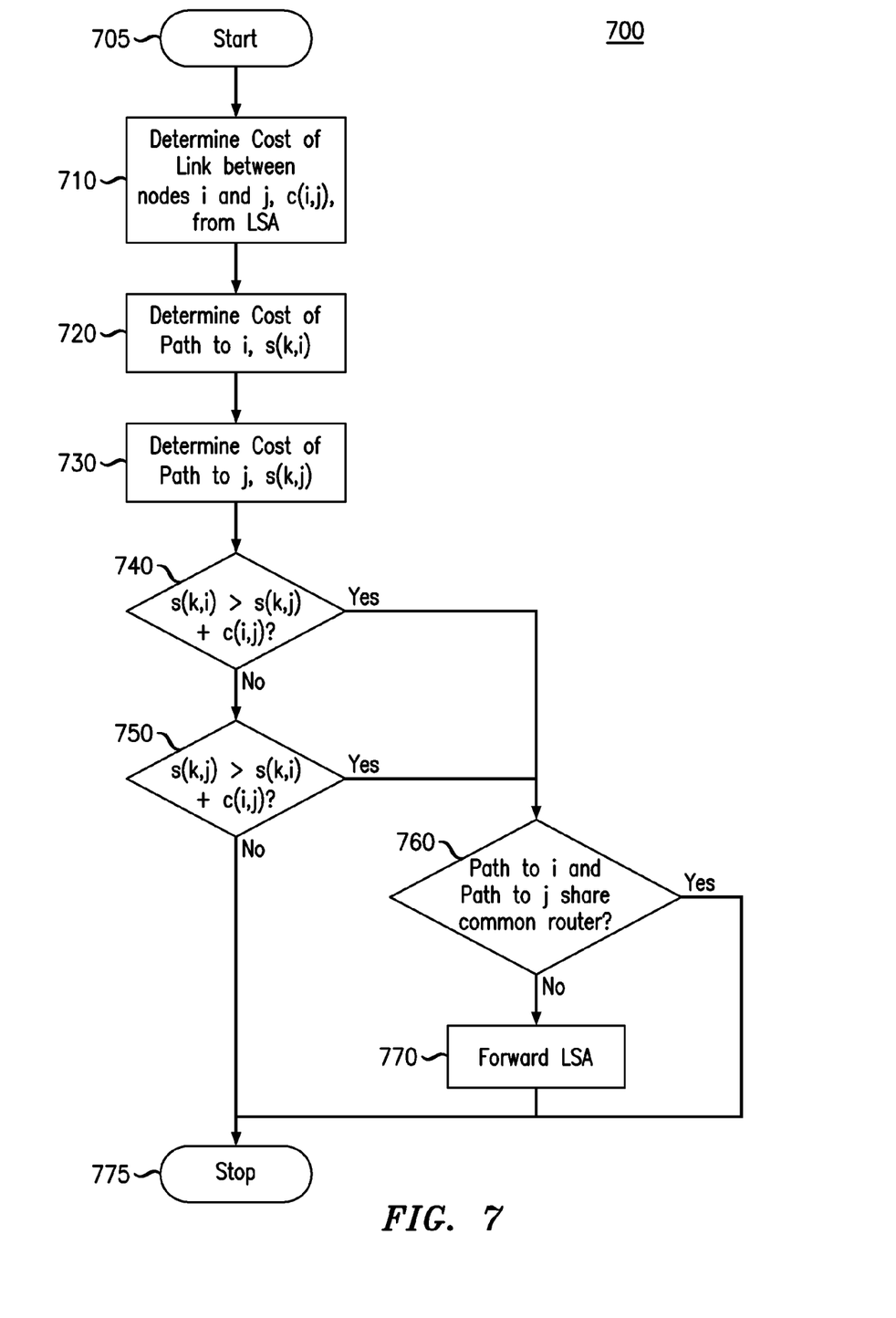
FIG. 7 illustrates another exemplary method for deciding whether to propagate an LSA.

FIG. 7 illustrates another exemplary method 700 for deciding whether to propagate an LSA. Method 700 may be performed by the various components of network node 400 such as, for example, LSA relay module 440. For the purposes of illustration, node 400 may also be referred to as "k" during the description of method 700. Method 700 may correspond to step 540 and/or step 570 of method 500. In various alternative embodiments, method 700 may be implemented in place of at least some of steps 520-580 of method 500.

Method 700 may begin in step 705 and proceed to step 710, where node 400 will begin to analyze the previously received LSA. Node 400 may perform method 700 or portions thereof for each link relevant to the LSA. For example, the LSA may describe the status of a single link or a node to which one or more links attach. Node 400 may determine the endpoints of the link, i and j, and determine the link cost associated with the link, c(i,j). Then, in step 720, node 400 may determine the cost of the current path to the first link endpoint, s(k,i). Likewise, in step 730, node 400 may determine the cost of the current path to second link endpoint, s(k,j).

Beginning in step 740, node 400 may determine whether the link provides a less costly path to any nodes and, consequently, whether the SPT should be recomputed. In step 740, node 400 may determine whether the path to link endpoint i via the new link is less costly than the previously used path to endpoint i. Likewise, in step 750, node 400 may determine whether the path to link endpoint j via the new link is less costly than the previously used path to endpoint j. If neither of these new potential paths are less costly than the previously used paths, method 700 may end in step 775, without forwarding the LSA to other nodes.

If, on the other hand, either of the potential new paths are better than a previously used path, method 700 may proceed to step 760. In various alternative embodiments, node 400 may simply forward the LSA at this point and the method may end. However, in the exemplary method 700, node 400 additionally determines whether another node may have already propagated the LSA to the nodes to which the LSA may be relevant. Accordingly, in step 760, node 400 may determine whether the paths to each of the link endpoints, i and j, share any common routers. If so, method 700 may simply end in step 775.

However, if the paths share no common routers, node 400 may propagate the LSA in step 770. Node 400 may propagate the LSA to each neighbor or, alternatively, only those neighbors that are not currently part of either of the two paths. Method 700 may then end in step 775.

Figure 8:
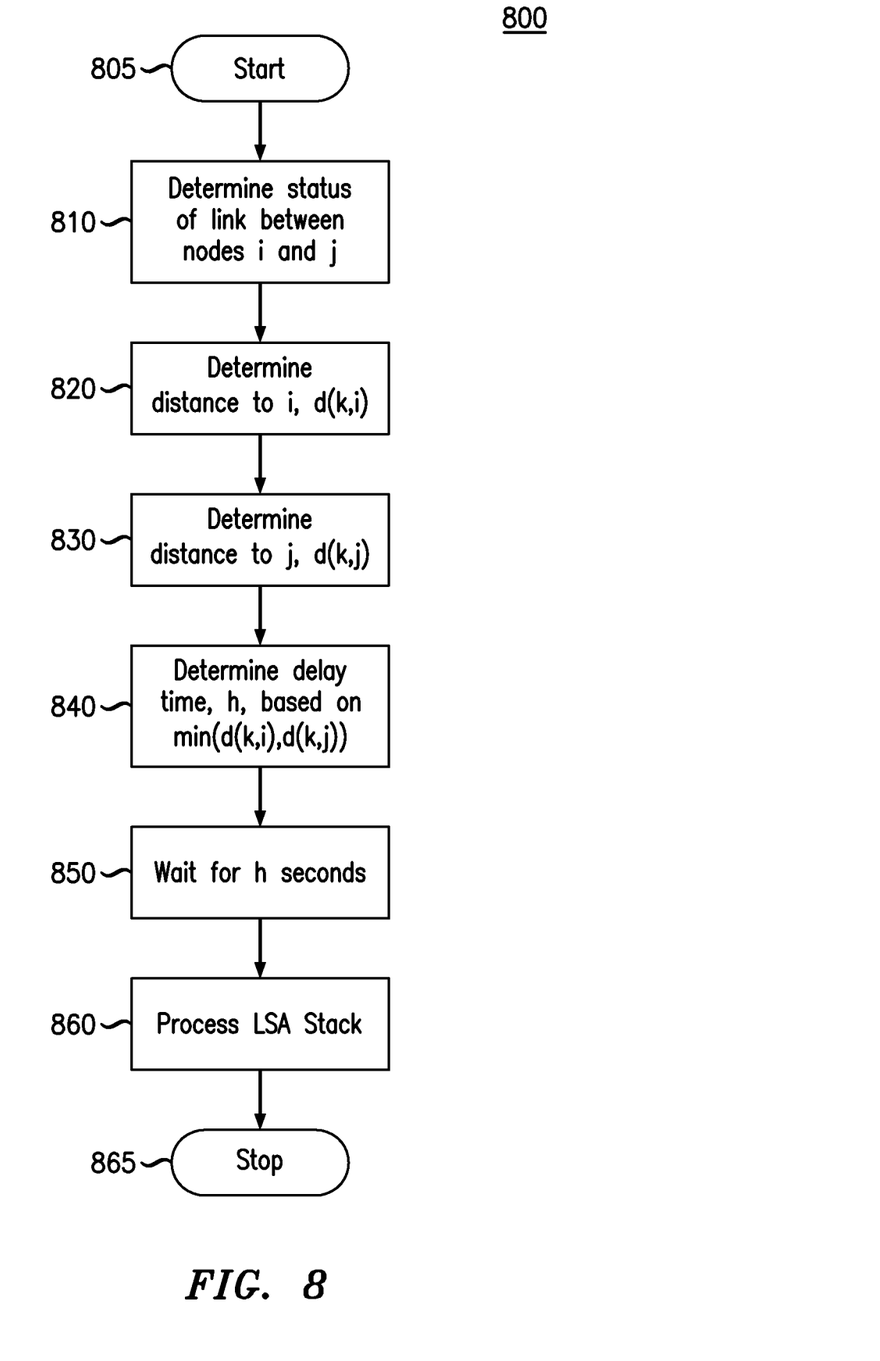
FIG. 8 illustrates an exemplary method for delaying processing of a received LSA.

FIG. 8 illustrates an exemplary method 800 for delaying processing of a received LSA. Method 800 may be performed by the various components of network node 400 such as, for example, SPT delay module 480. Method 800 may correspond to step 550 and/or step 580 of method 500. In various alternative embodiments, method 800 may be implemented in place of at least some of steps 520-580 of method 500.

Method 800 may begin in step 805 and proceed to step 820, where node 400 may interpret the LSA to determine which nodes are located at the endpoint of each link identified by the LSA. This step may simply include reading the information previously interpreted in processing the LSA. In steps 810 and 820, node 400 may determine the distance to each of the link endpoints, i and j, respectively. This distance metric may include the number of hops to each node, the geographic distance, the cost of the current paths to each node, and/or other information.

Node 400 may then, in step 840, use the lesser of the two distances to determine how long node 400 should wait before processing the LSA. This determination may be made, for example, by applying a mathematical function using the determined minimum distance as a variable or by reading a table of prescribed delays associated with various possible distances.

It should be noted that other methods may be employed to determine the amount of delay for each LSA. For example, various alternative embodiments may take into account the type of LSA received, the state change indicated by the LSA, or the number of other recently received LSAs when determining a delay time.

In step 850, node 400 may wait for the delay time to elapse. For example, node 400 may suspend the routing information update process for a time equal to the delay time. During this waiting period, additional LSAs may arrive at node 400. Such LSAs may be placed on an LSA stack or other data structure for future processing. Further, on receipt of such additional LSAs, another instance of method 800 or a similar method may run on node 400 to update the delay time. For example, node 400 may reduce, extend, and/or refresh the original wait period based on the new LSA.

Once the delay time has elapsed, node 400 may process the received LSAs in step 860. In various embodiments, received LSAs may be stored in a LIFO structure, such as a stack, such that the most recent LSAs will be processed first. Any LSAs overridden by a later LSA may then be ignored, further reducing the processing time associated with updating routing information. Node 400 may then generate a single SPT and update the forwarding table based on all of the received LSAs at once.

According to the foregoing description, various exemplary embodiments enable reduction of overhead associated with changes in network state. In particular, by avoiding propagation of update messages that have no bearing on routing information, bandwidth overhead may be reduced. Further, by delaying the processing of received network updates, multiple network updates may be processed at a single time and processing overhead may be reduced.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

The functions of the various elements shown in the FIGS., including any functional blocks labeled as "processors", may be provided through the use of dedicated hardware as well as hardware capable of executing processing steps in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of reducing overhead in a network performed at a network node, the method comprising:
   receiving, at the node, a network update message;
   determining whether the network update message should be propagated to other nodes, comprising:
      determining whether the network update message indicates that a link is up or down;
      determining whether a relevant network path structure includes the link;
      if the link is up and the relevant network path structure includes the link, determining that the network update message should not be propagated to other nodes; and
      if the link is down and the relevant network path structure does not include the link, determining that the network update message should not be propagated to other nodes;
   if the network update message should be propagated to other nodes, forwarding the network update message to at least one other node; and
   if the network update message should not be propagated to other nodes, refraining from forwarding the network update message to any other node.

2. The method of claim 1, wherein the step of determining whether the network update message should be propagated further comprises:
   determining whether routing information of the node should be changed in response to the network update message;
   if routing information should be changed, determining that the network update message should be propagated to other nodes; and
   if routing information should not be changed, determining that the network update message should not be propagated to other nodes.

3. The method of claim 1, wherein determining whether the network update message should be propagated to other nodes further comprises, if the link is down and the relevant network path structure includes the link, determining that the network update message should be propagated to other nodes.

4. The method of claim 1, wherein determining whether the network update message should be propagated to other nodes further comprises, if the link is down and the relevant network path structure includes the link:
   computing new routing information based on the network update message;
   determining whether the current routing information and the new routing information are different;
   if the current routing information and the new routing information are different, determining that the network update message should be propagated to other nodes; and
   if the current routing information and the new routing information are not different, determining that the network update message should not be propagated to other nodes.

5. The method of claim 1, wherein the link is a link between a second node and a third node, and wherein determining whether the network update message should be propagated to other nodes further comprises, if the link is up and the relevant network path structure does not include the link:
   determining a cost of a current path from the node to the second node;
   determining a cost of a current path from the node to the third node;
   determining a cost of the link;
   determining whether the cost of the current path to the second node is greater than the sum of the cost of the current path to the third node and the cost of the link;

determining whether the cost of the current path to the third node is greater than the sum of the cost of the current path to the second node and the cost of the link; and if the cost of the current path to the second node is not greater than the sum of the cost of the current path to the third node and the cost of the link and the current path to the third node is not greater than the sum of the cost of the current path to the second node and the cost of the link, determining that the network update message should not be propagated to other nodes.

6. The method of claim 1 further comprising:
determining a delay time for the network update message;
waiting for the delay time; and
after the delay time has elapsed, computing new routing information based on the network update message.

7. The method of claim 1, further comprising, if the network update message should not be propagated to other nodes:
constructing a marked network update message including at least a portion of the network update message and an indication that the network update message should not be propagated; and
transmitting the marked network update message to at least one other node.

8. The method of claim 1, wherein the step of refraining from forwarding the network update message to any other node comprises:
refraining from immediately forwarding the network update message to any other node;
storing the network update message;
waiting for a period of time; and
after the period of time has elapsed, transmitting the network update message to at least one other node along with at least one additional network update message.

9. A network node for reducing overhead in a network, the network node comprising:
a first interface that receives a packet from another node within the network;
a second interface that transmits packets to other nodes;
a routing information storage that stores routing information, wherein the routing information comprises at least one of: link state data, a shortest path tree, and a forwarding table;
a network update message identifier that determines that the packet is an network update message;
an network update message relay module that:
determines whether the network update message should be forwarded to other nodes wherein, in determining whether the network update message should be forwarded to other nodes, the network update message relay module:
determines whether the network update message indicates that a link is up or down,
determining whether the routing information storage includes the link;
if the link is up and the routing information storage includes the link, determines that the network update message should not be forwarded to other nodes, and
if the link is down and the routing information storage does not include the link, determines that the network update message should not be forwarded to other nodes,
if the network update message should be forwarded to other nodes, forwards the network update message to at least one other node via the second interface, and if the network update message should not be forwarded to other nodes, refrains from forwarding the network update message to any other nodes.

10. The network node of claim 9,
wherein, in determining whether the network update message should be forwarded to other nodes, the network update message relay module:
determines whether the routing information stored in routing information storage should be changed in response to the network update message,
if the routing information stored in routing information storage should be changed, determining that the network update message should be forwarded to other nodes, and
if the routing information stored in routing information storage should not be changed, determining that the network update message should not be forwarded to other nodes.

11. The network node of claim 9, wherein, in determining whether the network update message should be forwarded to other nodes, the network update message relay module further:
if the link is down and the current routing information includes the link, determines that the network update message should be forwarded to other nodes.

12. The network node of claim 9, further comprising:
a routing information generator that generates new routing information based on the network update message;
wherein, in determining whether the network update message should be forwarded to other nodes, the network update message relay module further:
determines whether the new routing information and a corresponding portion of routing information stored in routing information storage are different,
if the new routing information and the corresponding portion of routing information stored in routing information storage are different, determines that the network update message should be forwarded to other nodes, and
if the new routing information and the corresponding portion of routing information stored in routing information storage are not different, determines that the network update message should not be forwarded to other nodes.

13. The network node of claim 9, wherein the link is a link between a second node and a third node and, in determining whether the network update message should be forwarded to other nodes, the network update message relay module further:
determines a cost of a current path from the node to the second node;
determines a cost of a current path from the node to the third node;
determines a cost of the link;
determines whether the cost of the current path to the second node is greater than the sum of the cost of the current path to the third node and the cost of the link;
determines whether the cost of the current path to the third node is greater than the sum of the cost of the current path to the second node and the cost of the link; and
if the cost of the current path to the second node is not greater than the sum of the cost of the current path to the third node and the cost of the link and the cost of the current path to the third node is not greater than the sum of the cost of the current path to the second node and the cost of the link, determines that the network update message should not be forwarded to other nodes.

14. The network node of claim 9, further comprising:
a routing information delay module that:
    determines a delay time for the network update message, and
    waits for the delay time; and
a routing information generator that, after the delay time has elapsed, computes new routing information based on the network update message.

15. The network node of claim 9, wherein, if the network update message should not be propagated to other nodes, the network update message relay module further:
constructs a marked network update message including at least a portion of the network update message and an indication that the network update message should not be propagated; and
transmits the marked network update message to at least one other node via the second interface.

16. The network node of claim 9, wherein, in refraining from forwarding the network update message to any other node, the network update message relay module:
refrains from immediately forwarding the network update message to any other node;
waits for a period of time; and
after the period of time has elapsed, transmits the network update message to at least one other node along with at least one additional network update message via the second interface.

17. A non-transitory machine-readable storage medium encoded with instructions for execution on a network node for reducing overhead in a network, the machine-readable storage medium comprising:
instructions for receiving, at the node, a network update message;
instructions for determining whether the network update message should be propagated to other nodes comprising:
    instructions for determining whether the network update message indicates that a link is up or down,
    instructions for determining whether a relevant network path structure includes the link,
    instructions for, if the link is up and the relevant network path structure includes the link, determining that the network update message should not be propagated to other nodes, and
    instructions for, if the link is down and the relevant network path structure does not include the link, determining that the network update message should not be propagated to other nodes;
instructions for, if the network update message should be propagated to other nodes, forwarding the network update message to at least one other node; and
instructions for, if the network update message should not be propagated to other nodes, refraining from forwarding the network update message to any other node.

18. The non-transitory machine-readable storage medium of claim 17, wherein the instructions for determining whether the network update message should be propagated further comprise:
instructions for determining whether routing information of the node should be changed in response to the network update message;
instructions for, if routing information should be changed, determining that the network update message should be propagated to other nodes; and
instructions for, if routing information should not be changed, determining that the network update message should not be propagated to other nodes.

19. The non-transitory machine-readable storage medium of claim 17 wherein the instructions for determining whether the network update message should be propagated to other nodes further comprise instructions for, if the link is down and the relevant network path structure includes the link, determining that the network update message should be propagated to other nodes.

20. The non-transitory machine-readable storage medium of claim 17 wherein the instructions for determining whether the network update message should be propagated to other nodes further comprise instructions for, if the link is down and the relevant network path structure includes the link:
computing new routing information based on the network update message;
determining whether the current routing information and the new routing information are different;
if the current routing information and the new routing information are different, determining that the network update message should be propagated to other nodes; and
if the current routing information and the new routing information are not different, determining that the network update message should not be propagated to other nodes.

21. The non-transitory machine-readable storage medium of claim 17 wherein the link is a link between a second node and a third node, and wherein the instructions for determining whether the network update message should be propagated to other nodes further comprise instructions for, if the link is up and the relevant network path structure does not include the link:
determining a cost of a current path from the node to the second node;
determining a cost of a current path from the node to the third node;
determining a cost of the link;
determining whether the cost of the current path to the second node is greater than the sum of the cost of the current path to the third node and the cost of the link;
determining whether the cost of the current path to the third node is greater than the sum of the cost of the current path to the second node and the cost of the link; and
if the cost of the current path to the second node is not greater than the sum of the cost of the current path to the third node and the cost of the link and the current path to the third node is not greater than the sum of the cost of the current path to the second node and the cost of the link, determining that the network update message should not be propagated to other nodes.

22. The non-transitory machine-readable storage medium of claim 17 further comprising:
instructions for determining a delay time for the network update message;
instructions for waiting for the delay time; and
instructions for, after the delay time has elapsed, computing new routing information based on the network update message.

23. The non-transitory machine-readable storage medium of claim 17, further comprising instructions for, if the network update message should not be propagated to other nodes:
constructing a marked network update message including at least a portion of the network update message and an indication that the network update message should not be propagated; and
transmitting the marked network update message to at least one other node.

24. The non-transitory machine-readable storage medium of claim 17, wherein the instructions for refraining from forwarding the network update message to any other node comprise:
- instructions for refraining from immediately forwarding the network update message to any other node;
- instructions for storing the network update message;
- instructions for waiting for a period of time; and
- instructions for after the period of time has elapsed, transmitting the network update message to at least one other node along with at least one additional network update message.

\* \* \* \* \*